United States Patent
Katz et al.

(10) Patent No.: US 7,337,470 B2
(45) Date of Patent: Feb. 26, 2008

(54) METHOD FOR MINIMIZING DENIAL OF SERVICE ATTACKS ON NETWORK SERVERS

(75) Inventors: Neil Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 10/227,126

(22) Filed: Aug. 23, 2002

(65) Prior Publication Data
US 2004/0039938 A1    Feb. 26, 2004

(51) Int. Cl.
G06F 11/00     (2006.01)

(52) U.S. Cl. ............... 726/22; 713/150; 713/151; 380/262; 709/224; 709/226

(58) Field of Classification Search ............... 726/22; 713/150, 151, 168; 380/262; 709/226, 224
See application file for complete search history.

(56) References Cited

U.S. PATENT DOCUMENTS

| | | | | |
|---|---|---|---|---|
| 5,367,520 A | | 11/1994 | Cordell | 370/60 |
| 5,625,651 A | * | 4/1997 | Cioffi | 375/354 |
| 5,958,053 A | * | 9/1999 | Denker | 726/1 |
| 6,134,591 A | * | 10/2000 | Nickles | 709/229 |
| 6,145,010 A | * | 11/2000 | Hiscock et al. | 709/238 |
| 6,219,669 B1 | | 4/2001 | Haff et al. | 707/10 |
| 6,643,683 B1 | * | 11/2003 | Drumm et al. | 709/203 |
| 6,662,223 B1 | * | 12/2003 | Zhang et al. | 709/224 |
| 6,671,720 B1 | * | 12/2003 | Cheston et al. | 709/222 |
| 6,779,033 B1 | * | 8/2004 | Watson et al. | 709/227 |
| 7,047,303 B2 | * | 5/2006 | Lingafelt et al. | 709/229 |
| 7,107,612 B1 | * | 9/2006 | Xie et al. | 726/13 |
| 2001/0042200 A1 | * | 11/2001 | Lamberton et al. | 713/151 |
| 2003/0152101 A1 | * | 8/2003 | Feng | 370/445 |
| 2003/0195861 A1 | * | 10/2003 | McClure et al. | 707/1 |
| 2004/0078384 A1 | * | 4/2004 | Keir et al. | 707/102 |
| 2005/0076238 A1 | * | 4/2005 | Ormazabal et al. | 713/201 |

FOREIGN PATENT DOCUMENTS

WO    WO 01/06386    1/2001

OTHER PUBLICATIONS

*RSA SecurID Smart Cards*, RSA Security, Inc., <http://www.rsasecurity.com/products/security/datasheets/SIDSC_DS_1201.pdf>, (visited Jun. 27, 2002).
*S/MIME Frequently Asked Questions*, RSA Security, Inc., <http://www.rsasecurity.com/standards/smime/faq.html>, (visited Jun. 27, 2002).
*WAVE*, Wave Systems Corp., Part # 03-000047, (viewed Jun. 27, 2002).
*Synk4/Syn Flooding Denial of Service Attack*, <http://www.wwdsi.com/demo.saint_tutorials/synk4.html>, (visited Jun. 24, 2002).

* cited by examiner

*Primary Examiner*—Nasser Moazzami
*Assistant Examiner*—Fikremariam Yalew
(74) *Attorney, Agent, or Firm*—Akerman Senterfitt

(57) ABSTRACT

A method for providing communications network security can include receiving a round-trip network latency for a client specifying an open port duration. A port can be opened to receive a request from the client. The port can be closed when an amount of time at least as great as the open port duration has passed since the opening of the port.

12 Claims, 2 Drawing Sheets

METHOD FOR MINIMIZING DENIAL OF SERVICE ATTACKS ON NETWORK SERVERS

BACKGROUND OF THE INVENTION

1. Technical Field

This invention relates to the field of network security, and more particularly, to defending against attacks on network servers.

2. Description of the Related Art

Network security is a growing concern for operators of network servers, for example Internet servers. Computer hackers frequently attack network servers to cause disruption in network services as well as corrupt data. Notably, there are a myriad of possible ways a network server can be attacked. For example, computer hackers frequently use techniques to search for open ports through which the server can be attacked. Once an open port is found, hackers often attempt to circumvent the server's security in order to gain access to secure files.

Another method commonly used by computer hackers, known as a denial of service (DoS) attack, is to attack a server in order to tie up server resources so that the resources become unavailable to establish any new client connections. Accordingly, when valid clients attempt to connect to the server, the server responds by issuing denial of service responses.

One DoS attack technique, known as SYN flooding, exploits a connection establishment protocol commonly referred to as a three-way handshake. The client system begins the three-way handshake process by sending a synchronous (SYN) message to the server. A SYN message is a bit flag in a TCP header that when set indicates that synchronization is requested with a remote server. The server then acknowledges the SYN message by sending a synchronization acknowledgment (SYN-ACK) message to the client. The client then completes the connection by responding with an acknowledgment (ACK) message. Once the connection is open, service-specific data can be exchanged between the client and the server.

A half-open connection occurs when the server responds to a client by sending a SYN-ACK message, but never receives a responsive ACK message from the client. SYN flooding works by creating scores of half-open connections. This is commonly accomplished using a technique known as IP-spoofing, wherein an attacking client sends apparently legitimate SYN messages to a victim server. The SYN messages, however, are not legitimate in that the SYN messages reference other clients that are unable to respond to the SYN-ACK messages. Hence, the victim server never receives the ACK message completing the connection.

The data structure on the victim server for the half-open connections will eventually fill, rendering the server unable to accept any new incoming connections until the table is purged. Accordingly, legitimate clients attempting to connect to the victim server will receive the DoS response. Normally there is a timeout associated with a pending connection, so the half-open connections will eventually expire and the victim server system can recover. However, the attacking system can simply continue sending IP-spoofed packets requesting new connections faster than the pending connections expire, thereby causing the server to crash or to otherwise be rendered inoperative.

Methods currently exist to provide a measure of security against DoS attacks while still allowing client-server communications. These methods, however, are only moderately successful. One such method randomly changes the server port addresses through which a server and a client communicate, calculating each new port with a random number generator. Both the client and server use a copy of the same random number generator and share a random seed, which is a value that a random generator uses to start the random number generation process. Accordingly, the order in which random numbers are generated at both the server and client ends of the communication link remain synchronized. Hence, the client and server can each calculate the same sequence of port addresses used for changing ports.

One disadvantage of such port-jumping, security techniques, however, is determining the period which each port is to remain open prior to jumping to a new port. If a particular port address is open too long, a hacker may have enough time to scan the server, find the open port, and infiltrate the system through the open port. If a port address is not open long enough, the port may close before a packet sent by a client arrives, especially if there is a high network latency between the client and the server.

Network latency, which is a synonym for network delay, is an expression of how much time it takes for a packet of data to get from one designated point to another. The contributors to network latency include propagation, transmission, router, processing, and other computer and storage delays. Propagation delay is simply the time taken for a packet to travel between one place and another at the speed of light. Transmission delay is delay introduced by a transmission medium itself, for example, optical fiber, electrical wires, and other transmission mediums. Router and processing delays are caused by the time taken to examine and possibly change the header in a packet at each gateway node. Computer and storage delays occur at each end of network where a packet may be subject to storage and hard disk access delays. Notably, computer delays also can occur at intermediate devices such as switches and bridges.

Because latency results from multiple contributors, it is difficult to gauge how much latency will be associated with a given connection. Further, changing conditions of the network environment effect the various delay times. For example, network congestion can cause increased router and processing delays. The propagation and transmission delays can be affected if network congestion causes alternate transmission routes to be used for client-server communications. Moreover, computer and storage delays can be affected by increased server load which reduces available server resources. Hence, current security techniques commonly keep ports open for a relatively long period of time to insure that the ports are open long enough to receive all packets that are sent to the ports during high network latency periods. If the ports are close too quickly, packets can be blocked by a closed port and the client-server connection can be lost.

SUMMARY OF THE INVENTION

The invention disclosed herein provides a network security solution for minimizing denial of service (DoS) attacks on network servers. The present invention aids servers in eluding potential unauthorized users attempting to infiltrate a system through open ports. In particular, the present invention provides a solution for dynamically varying the timing of port openings and closings according to a latency value to optimize the time duration that ports are open. In doing so, the present invention accounts for changing conditions of the network environment, such as network congestion, server load, and other network conditions affecting network latency. Accordingly, the server ports are open long enough to receive packets sent to those ports by authorized clients, even when high network latency conditions exist, yet the ports are not held open for an unnecessarily long period of time. The risk of an unauthorized user scanning a server to find an open port which can be used to infiltrate the server is thereby reduced.

One aspect of the present invention can include a method of providing communications network security. The method can include receiving a round-trip latency from a client specifying an open port duration. Although the round-trip latency can specify a value, the round-trip latency also can specify a time the client sends a request and a time the client receives a response to the request such that the server can compute the open port duration. The open port duration can be scaled by a predetermined value. A port can be opened to receive a request from the client. The port can be closed when an amount of time at least as great as the open port duration has passed since the opening of the port.

Accordingly, a second port can be opened. The second port can be opened at a randomly generated port address. Notably, the open port duration can be replaced with a second open port duration. For example, a subsequent round-trip latency can be received and used to determine an updated open port duration. The updated open port duration can be provided to the client to synchronize the client and the server. The updated open port duration also can be scaled by a predetermined value.

Another aspect of the present invention can include a method of providing communications network security wherein a one-way latency is determined when receiving a packet from a client. The one-way latency can specify an open port duration. For example, a packet that is time stamped with a send time can be received from a client. A time that the packet is received can be noted. A difference between the send time and the receive time can be calculated. The open port duration can be scaled by a predetermined value.

The open port duration can be shared with the client and a port can be opened to receive a request from the client. The port can be closed when an amount of time at least as great as the open port duration has passed since the opening of the port. A second port can be opened when the port closes. The second port can be opened at a randomly generated port address. Notably, the open port duration can be replaced with a second open port duration. For example, a subsequent one-way latency can be determined which specifies an updated open port duration. The updated open port duration can be provided to the client to synchronize the client and the server. Still, the updated open port duration can be scaled by a predetermined value.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a network security solution which can minimize denial of service (DoS) attacks on network servers and help servers elude potential unauthorized users attempting to infiltrate a system through open ports. In particular, the present invention provides a solution for providing network security while maintaining stable client-server network connections by randomly changing active port addresses and dynamically varying the timing of port openings and closings according to a latency value. The latency value optimizes the time duration that ports are open, accounting for changing conditions of the network environment, such as network congestion, server load, and other network conditions affecting network latency. Accordingly, the server ports are open long enough to receive packets sent to server ports by authorized clients, even when conditions of high network latency exist, yet the ports are not held open for an unnecessarily long period of time. The risk of an unauthorized user scanning a server to find an open port which can be used to infiltrate the server is thereby reduced.

Figure 1:
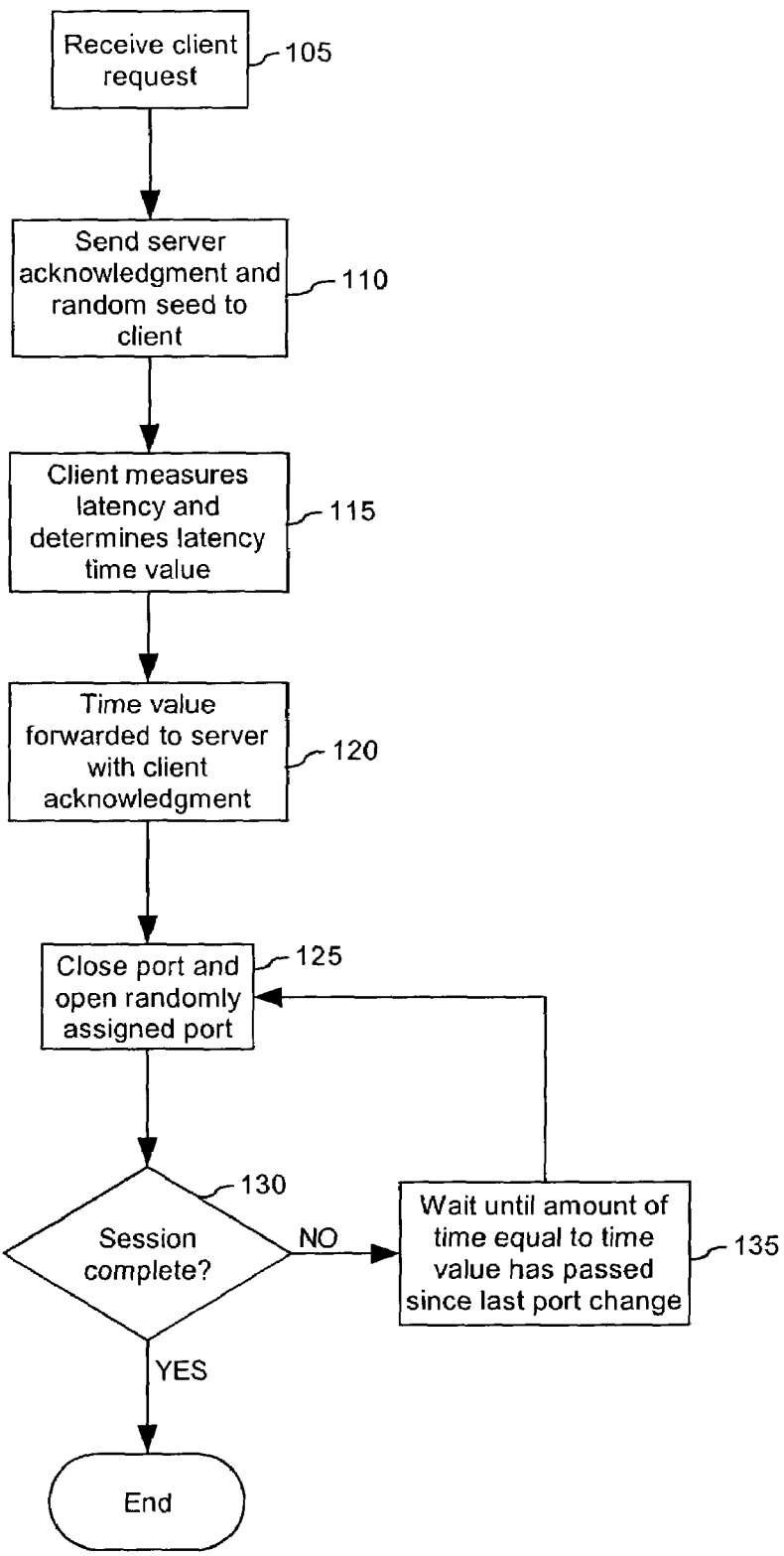
FIG. 1 is a flow chart showing a method for providing network security in accordance with the present invention.

FIG. 1 is a flow chart 100 that shows a method for providing network security in accordance with the present invention. The method can begin in a state wherein an agreement has been established between a client and a server regarding which port communication can be initiated as well as the time the port will be open to initiate client-server synchronization. In order to elude potential unauthorized users, the initial port where the client request is sent can be protected using known techniques to ensure that limited access to the port is provided. For example, in one arrangement using secure multi-purpose Internet mail extension (S/MIME), the client can send to the server an electronic message, such as an instant message or electronic mail, containing a secure authenticated request for the port information. The server can respond by sending an electronic message disclosing the port address and the port open time to the client, either in a single message or in separate messages for added security. Public and private keys can be used to securely code and decode the port information contained in the messages. Other methods can be used as well, for example using the services of a Certificate Authority to pass the initial port information, or using a physical token as a seed in a random number generator that determines an initial port. Nonetheless, many other security techniques can be used to securely provide the first port address. Accordingly, the examples disclosed herein should not be construed as a limitation of the present invention.

Referring to step 105, a server can receive a client request, for example a synchronous (SYN) message, wherein the client requests a connection with the server. Referring to step 110, the server can respond to the client request with a server acknowledgment, such as a synchronous acknowledgment (SYN-ACK) message. The server acknowledgment can include a random seed shared by the server that can be used in a random pattern generator to generate random port addresses. The random seed can be encrypted when sent, again using known encryption techniques. For example, the seed can be encrypted and decrypted using public and private keys as previously discussed, or using security systems built into standard Internet browsers. Notably, the server and the client each can use a copy of the same seed and a copy of the same random pattern generator to insure that the client and server generate the same sequence of random port addresses.

Referring to step 115, the client can measure the network latency between the client and the server. As defined herein, network latency is an expression of how much time it takes a packet of data to get from one designated point to another. In one arrangement, to determine the network latency, a client can note the time when a packet, such as a client request, is sent to a server. The client then can note the time a server acknowledgment is received in response to the packet. The client can utilize an internal clock to determine the send and receive times, but other methods can be used as well, for example an Internet time clock, a Global Positioning Satellite (GPS) time clock, and/or other time measuring devices. The round-trip network latency can be computed as the difference between the send time and the receive time.

The open port duration then can be derived from the round-trip latency. Notably, the open port duration should be long enough so that when the client sends a packet to a server port, the server port is still open when the packet arrives. Accordingly, the open port duration also can be computed by multiplying or scaling the measured round-trip network latency by some factor. Alternatively, the measured round-trip latency can be scaled by adding a predetermined time value. For example, although the open port duration may only need to be at least equal to the measured round-trip network latency, the round-trip latency can be scaled by a factor 1, 2, or 3. This can insure that a port is open long enough for a packet to be transmitted from the client to the server and for the server to receive the packet.

Referring to step 120, the network open port duration can be forwarded to the server with a client acknowledgment that completes the process establishing a connection between the client and server. Alternatively, the client can forward to the server the start and end times of the round-trip latency so that the server can compute the open port duration. The server can then share the open port duration with the client.

Referring to step 125, after a connection is established between the client and the server (i.e. client and server are synchronized), the initial port can be closed and a first port can be opened at a first random port address generated by the random pattern generator. Importantly, referring to decision block 130 and step 135, the network open port duration can be used to time port openings and closings so that the client and server remain synchronized until a communication session is complete. For example, the time a port is open can be monitored. When the port has been opened for an amount of time equal to the network open port duration, the port can be closed and a next port can be opened. In the case that a packet is still being received when a port times out, the port can be held open just long enough to finish receiving the packet. In order to keep synchronization between the client and the server, the timing for the next port can begin when the first port times out, even though the first port may be held open longer to complete a packet transfer. The next port also can be held open for an amount of time equal to the network open port duration, at which time it closes and a third port opens, and so on.

Network congestion and changing server loads often can cause variation in network latency times. Hence, network latency times can be monitored and the open port duration dynamically adjusted accordingly. In one arrangement, the network latency can be monitored each time a new packet is sent. In this instance, the network latency would be measured from the time a packet is sent until a response to the packet is received. The open port duration can be re-calculated with each new network latency measurement or when the network latency varies more than a predetermined percentage or amount.

In another arrangement, the network latency can be measured periodically. For example, the network latency can be measured from the time every fifth packet is sent until a response is received for that particular packet. Again, the open port duration can be re-calculated after each network latency measurement. In yet another arrangement, the network latency can be continuously or periodically measured using one of the above techniques, and an average network latency can be computed and used for determining the open port duration. For example, the average of every five network latency measurements can be used.

In consequence, the port openings and closings can be timed using a dynamically changing open port duration to keep the port openings and closings optimized for the network environment. For example, if the network becomes congested and network latencies begin to increase, a new open port duration can be computed and shared between the client and the server. Likewise, if network latency times show a trend that is decreasing, a new open port duration can again be computed to minimize the amount of time each port remains open, thereby reducing the chance of an unauthorized user finding and attacking an open port.

Figure 2:
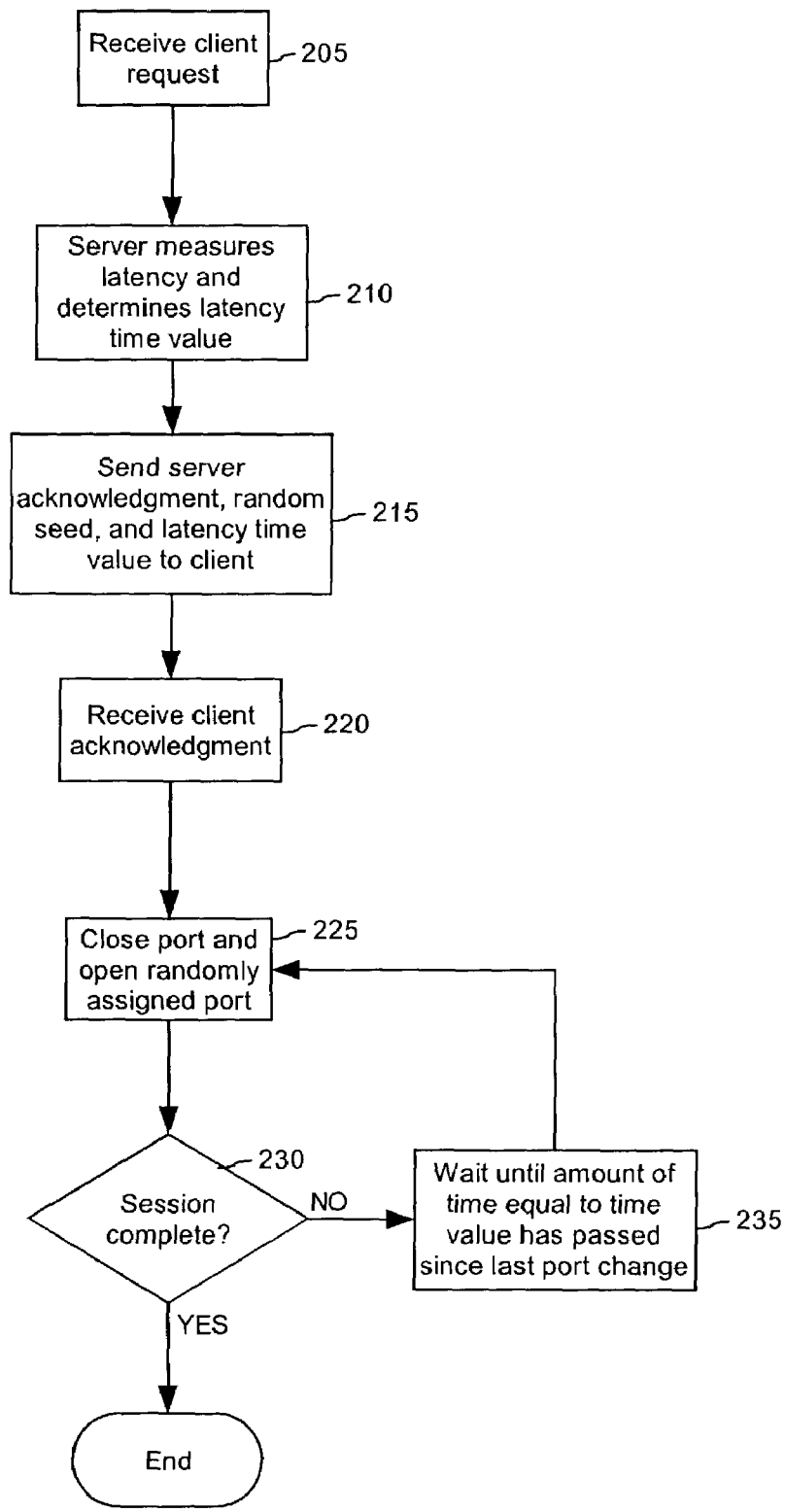
FIG. 2 is a flow chart showing an alternate method for providing network security in accordance with the present invention.

FIG. 2 is a flow chart 200 showing another embodiment of the present invention. Referring to step 205, the server can receive a client request to establish a server connection. In contrast to the arrangement previously discussed wherein the client measures network latency and determines a open port duration, in this embodiment the server can measure a one-way network latency and use the one-way network latency measurement to determine the open port duration, as shown in step 210.

To determine the one-way network latency, the client can time stamp a packet sent to the server, such as a client request, to indicate the time the packet was sent. For example, the client can time stamp a client request with Internet time, a time provided by a GPS network time clock, or some other centralized time source available over a network. The server then can note the time the client request was received. To insure accuracy, it is preferable that the server determine the receive time for the client request by the same method that the client determines the send time. The one-way network latency can be calculated as the difference between the send time and the receive time. The open port duration can then be computed by scaling the measured one-way network latency by some factor or adding a predetermined time value to the one-way network latency. For example, the open port duration can be computed to be at least twice the measured one-way network latency, or some other factor.

The server then can send the open port duration to the client along with the random seed in the server acknowledgment, as shown in step 215. Referring to step 220, the client can send the server a client acknowledgment indicating the server acknowledgment was received, at which time the server can open the connection. The initial port then can be closed and a first random port can be opened, as shown in step 225. Referring to decision block 230 and step 235, the open port duration can be used to time port openings and closings so that the client and server remain synchronized until a communication session is complete, as previously discussed.

As with the arrangement where the round-trip network latency is monitored to dynamically adjust the open port duration, the one-way network latency also can be monitored to optimize port openings and closings for particular network conditions. For example, the open port duration can be adjusted to account for network congestion, server load, and other circumstances that affect network latency.

In one arrangement, a client can time-stamp each packet sent to the server and the server can calculate the one-way network latency for each packet based on the difference between the time the server receives the packet and the time the packet was sent. Each new network latency measurement can be used to calculate a new open port duration or, as previously discussed, the network latency can be periodically monitored. Further, as also previously discussed, average network latencies can be monitored and used to re-calculate open port durations. Regardless, updated open port durations can be continually and/or periodically communicated to the client.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing communications network security on a server, comprising:
   prior to initiating a communications session between a client and said server, securely communicating to said client an address of an initial port of said server available for initial client-server synchronization and an open port duration for said initial port;
   sending an acknowledgement from said server to said client in response to a client request received at said initial port, the acknowledgement containing a random seed to generate a random port address based upon a random pattern generator shared by said server and said client;
   determining a dynamically-variable open port duration based upon a computed round-trip latency between said client and said server, and sending said open port duration to said server at said initial port;
   closing said initial port and opening a second port of said server corresponding to said random port address; and
   if a session is not complete when said open port duration elapses, closing said second port and opening another port at another randomly generated port address.

2. The method of claim 1, further comprising:
   scaling said open port duration by a predetermined value.

3. The method of claim 1, wherein said round-trip latency specifies a time said client sends a request and a time said client receives a response to said request from said server.

4. The method of claim 1, further comprising:
   replacing said open port duration with a second open port duration.

5. The method of claim 1, further comprising:
   determining an updated open port duration from a subsequent round-trip latency; and
   providing said updated open port duration to said client to synchronize said client and said server.

6. The method of claim 5, further comprising:
   scaling said updated open port duration by a predetermined value.

7. A method of providing communications network security, comprising:
   prior to initiating a communications session between a client and said server, securely communicating to said client an address of an initial port of said server available for initial client-server synchronization and an open port duration for said initial port;
   determining a dynamically-variable open port duration based upon a computed one-way latency between said client and said server;
   opening said initial port of said server corresponding to said initial port address;
   sending an acknowledgement from said server to said client, the acknowledgement containing a random seed to generate a random port address based upon a random pattern generator shared by said server and said client; and
   closing said initial port and opening a second port of said server corresponding to said random port address.

8. The method of claim 7, further comprising:
   scaling said open port duration by a predetermined value.

9. The method of claim 7, said step of determining an open port duration using a one-way latency comprising:
   receiving from a client a packet that is time stamped with a send time;
   noting a receive time when said packet is received; and
   calculating a difference between said send time and said receive time.

10. The method of claim 7, further comprising the step:
    replacing said open port duration with a second open port duration.

11. The method of claim 7, further comprising:
    determining an updated open port duration from a subsequent one-way latency; and
    providing said updated open port duration to said client to synchronize said client and said server.

12. The method of claim 11, further comprising:
    scaling said updated open port duration by a predetermined value.

* * * * *